J. W. SHAFER.
AUTOMATIC LUBRICATOR.
APPLICATION FILED FEB. 4, 1909.

959,267.

Patented May 24, 1910.

Witnesses
W. E. Allen.
J. M. Wynkoop.

Inventor
John W. Shafer.
By Knight Bros
Attorney

UNITED STATES PATENT OFFICE.

JOHN WILLIAM SHAFER, OF CHICAGO, ILLINOIS, ASSIGNOR OF ONE-HALF TO FRANK YOUNG, OF CHICAGO, ILLINOIS.

AUTOMATIC LUBRICATOR.

959,267.   Specification of Letters Patent.   Patented May 24, 1910.

Application filed February 4, 1909. Serial No. 476,075.

*To all whom it may concern:*

Be it known that I, JOHN W. SHAFER, a citizen of the United States, residing at Chicago, in the county of Cook and State of Illinois, have invented certain new and useful Improvements in Automatic Lubricators, of which the following is a specification.

This invention relates to the general class of lubricators but more particularly to a lubricator adapted for use in connection with air-pumps, air-compressors and similar devices.

The device might properly be termed a suction-lubricator in that, it permits a supply of lubricant to escape from a reservoir on the suction stroke of the pump piston so as to lubricate the interior of the cylinder. The valve which normally closes the outlet from the supply reservoir is seated by a spring whose tension may be regulated to suit the conditions under which the lubricator is working.

The primary object of the invention is to provide a lubricator which will permit a determined quantity of the lubricant to be released at given times, and to insure the introduction thereof into the part to be lubricated.

It is also the object to improve generally upon the present class of lubricators now employed.

Figure 1:
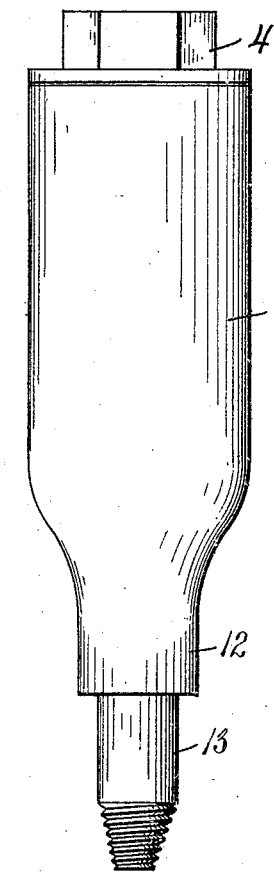
Figure 2:
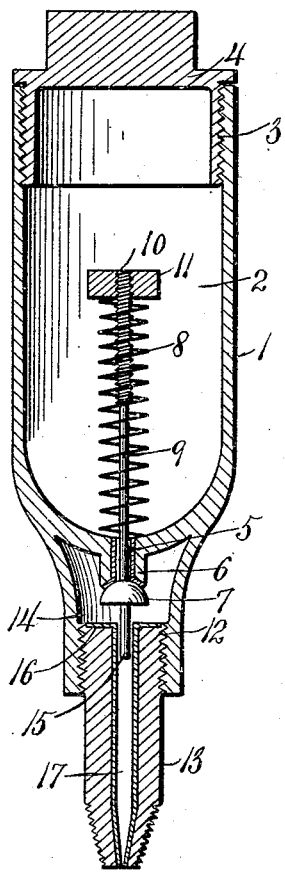

In the drawings: Figure 1 is an elevational view of a lubricator constructed in accordance with my invention and, Fig. 2 is a vertical longitudinal sectional view thereof.

The form of my invention herein shown consists of a shell 1 comprising a reservoir 2 to hold the lubricant which may be introduced into the reservoir through an opening 3 at one end of the shell and normally closed by a screw plug 4. The discharge end of the reservoir is provided with a depending tubular member 6 having an inner lining 5. Said member 6 and lining 5 constitute a neck having a depressed lower end within which seats the semi-spherical valve 7.

The numeral 5 indicates a lining or sleeve for the reservoir outlet opening. By enlarging the transfer chamber laterally and extending the tubular member 6 toward the bottom of said chamber, as shown, several advantages accrue. The transfer chamber is laterally enlarged and permits greater freedom of flow of the oil and less interference by the upward movement of the valve. It leaves a larger supply of oil in the transfer chamber while bringing the discharge opening closer to the bore of the nipple and requires less throw of the valve, and it provides a space for trapped air above the oil in the transfer chamber that produces a superior action. The valve 7 is held upon its seat by a spring 8 surrounding a valve stem 9 projecting within the reservoir and provided with a threaded end 10 on which is a tension nut 11. One end of the spring 8 bears against the end of the reservoir 2 while the other end of said spring bears against the nut 11. The position of the nut 11 upon the stem 9 will determine the expansive force of the spring 8 and therefore the pressure upon the valve 7.

Formed integral with the reservoir 2 is an internally threaded throat 12 to receive a nipple 13 which is adapted to be screwed into the casing of the part to be lubricated.

17 indicates a lining or sleeve for the opening through the nipple. The nipple extends only part way into the throat 12 so as (in conjunction with the bottom of the reservoir 2) to provide a transferring chamber 14 into which the lubricant may enter before passing into the nipple 13. Depending from the valve 7 is a pin or stem 15 which forms a dual function; that is the stem 15 not only guides the valve on to the seat 16, formed by the end of the nipple 13, but it also serves as a plunger to force any accumulation of lubricant in the passage 17 of the nipple therefrom.

The operation of the device is as follows: Upon the proper stroke of the piston (not shown) the valve will be moved off its upper seat and seated upon the end of the nipple just long enough to permit a determined quantity of the lubricant to flow from the reservoir into the chamber 14 when the spring 8 will cause the valve to again seat itself upon the upper seat. This intermittent motion will continue in time with the piston so as to allow a small quantity of lubricating fluid to flow into the passage 17 through which it will be forced by the plunger or stem 15.

It will be apparent that the parts are readily accessible for repairs or for other purposes and that the end 16 of the nipple will limit the longitudinal movement of the valve 7 in one direction.

Having thus described my invention, what I claim as new therein, and desire to secure by Letters Patent is:—

1. A lubricator for piston cylinders or the like comprising a reservoir having a discharge opening, an attaching and feeding nipple having a bore and a valve within an enlarged transfer chamber, said chamber being located intermediate the discharge opening and the nipple, said valve seating alternately to close the bore of the nipple and the discharge opening of the reservoir; said discharge opening and the seat for the valve that closes it being formed in a neck projecting into the transfer chamber and leaving a surrounding space.

2. A lubricator comprising a shell providing a reservoir, a neck depending from said shell and having an outlet opening, the lower end of said neck being concave to provide a valve seat, a depending throat formed integral with said shell and providing a lubricant transferring chamber, said neck portion located within said chamber, a nipple detachably secured to said throat and communicating with the transferring chamber, a semi-spherical valve mounted on a stem and operable within said transferring chamber whereby to alternately close the neck and nipple openings, the spherical face of said valve adapted to seat within the concave face of the neck portion, and a spring seated within the reservoir and surrounding the valve stem and operating to normally seat the valve on said concave face.

The foregoing specification signed at Chicago, Illinois, this first day of February, 1909.

JOHN WILLIAM SHAFER.

In presence of—
  WILLIAM P. SLAYTON,
  C. E. CLUTTERHAM.